(12) United States Patent
Adachi

(10) Patent No.: US 7,471,730 B2
(45) Date of Patent: Dec. 30, 2008

(54) TRANSMITTING METHOD AND TRANSMITTING APPARATUS

(75) Inventor: Akifumi Adachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 665 days.

(21) Appl. No.: 10/832,087

(22) Filed: Apr. 26, 2004

(65) Prior Publication Data
US 2005/0111568 A1 May 26, 2005

(30) Foreign Application Priority Data
Nov. 20, 2003 (JP) ............................. 2003-390057

(51) Int. Cl.
*H04K 1/10* (2006.01)
*H04L 27/28* (2006.01)
(52) U.S. Cl. ...................... 375/260; 375/261; 375/295; 375/298
(58) Field of Classification Search ................. 375/260, 375/261, 295, 298
See application file for complete search history.

(56) References Cited

U.S. PATENT DOCUMENTS

2005/0013238 A1* 1/2005 Hansen ........................ 370/203

FOREIGN PATENT DOCUMENTS

| | | |
|---|---|---|
| EP | 1 051 005 | 11/2000 |
| EP | 1 499 081 | 1/2005 |
| JP | 52-113668 | 9/1977 |
| JP | 8-23359 | 1/1996 |
| JP | 8-149170 | 6/1996 |
| WO | WO 99/53667 | 10/1999 |
| WO | WO 2004/095793 | 11/2004 |

OTHER PUBLICATIONS

European Search Report dated Nov. 28, 2006 for corresponding European Application EP 04 25 2377.

* cited by examiner

*Primary Examiner*—Ted Wang
(74) *Attorney, Agent, or Firm*—Katten Muchin Rosenman LLP

(57) ABSTRACT

Disclosed is a transmitting apparatus for transmitting a signal, which has been obtained by applying an inverse Fourier transform to a plurality of digital subcarrier signals having frequencies that differ from one another, after subjecting the signal to at least a digital-to-analog conversion. Frequencies in the vicinity of 0 Hz are not used as frequencies of valid subcarrier signals. Further, frequencies included in frequency ranges of $f_{-M/2}$ to $f_{-N/2}$, $f_{M/2}$ to $f_{(N/2)-1}$ are used as the frequencies of the valid subcarrier signals, where N-number of subcarrier frequencies are represented by $f_{-N/2}$, $f_{(-N/2)+1}$, ..., $f_0$, $f_1$, ... $f_{(N/2)-1}$ and frequencies on both sides farthest from 0 Hz that are not used as the frequencies of the valid subcarrier signals are represented by $f_{-M/2}$, $f_{M/2}$.

16 Claims, 12 Drawing Sheets

SIGNIFICANT DATA FROM S/P IS INPUT EXCEPT FOR INPUTS OF 0

SIGNIFICANT DATA FROM
S/P IS INPUT EXCEPT FOR
INPUTS OF 0

SAMPLE AND HOLD

US 7,471,730 B2

TRANSMITTING METHOD AND TRANSMITTING APPARATUS

BACKGROUND OF THE INVENTION

This invention relates to a transmitting method and apparatus and, more particularly, to a transmitting method and apparatus in which signals obtained by applying an inverse Fourier transform to a plurality of digital subcarrier signals having frequencies that differ from one another are transmitted after being subjected at least to a digital-to-analog conversion.

Baseband modulation processing has become complicated in recent years as in the case of CDMA (Code Division Multiple Access) and OFDM (Orthogonal Frequency Division Multiplexing), and numerical processing often is executed using integrated circuits such as an FPGA (Field Programmable Gate Array) or LSI (Large-Scale Integration). FIG. 9 illustrates an example of the structure of a modulating apparatus for performing OFDM. This is a typical example of the prior art.

A digital signal processor 1 executes digital signal processing in conformity with a reference clock signal CLK that is output from an oscillator 2. More specifically, a baseband signal processor 1a executes signal processing (baseband signal processing) that is not essential for OFDM, e.g., processing such as appending of an error correction/detection code to a signal to be transmitted, interleaving, multivalued modulation and code spreading. A serial/parallel converter (S/P converter) 1b converts the result of processing (transmit data) by the baseband signal processor 1a to parallel data, and an IFFT (inverse fast-Fourier transform) unit 1c executes IFFT processing using N-number of items of parallel data $D_0$ to $D_{N-1}$ as N-number of subcarriers, thereby effecting a conversion to discrete time signals. Depending upon the scheme, there are also arrangements in which interleaving, multivalued modulation and code spreading are executed after the S/P conversion, unlike the above scheme. Either arrangement may be used in the present invention.

IFFT signal processing is easy to understand if it is described based upon the concept of subcarriers in the frequency domain. N-number of input signals enter the IFFT unit 1c in parallel as N-number of subcarrier components. These signals give the size and argument of the N-number of subcarriers. With a frequency that is 1/N of the FFT sampling frequency $f_N$ serving as a reference, each subcarrier is a complex sine wave that is a whole-number multiple of this reference frequency. Here N represents the size of the FFT (fast-Fourier transform) and $f_N$ the FFT sampling frequency.

The frequency of an n-th subcarrier is given by the following equation:

$$f_n = n/Nf_N, (n=\text{integer of } -N/2 \sim N/2-1)$$

OFDM is an operation through which an output signal is obtained by adding all complex sinusoidal signals generated by these subcarriers.

Consider a more practical OFDM scheme. A number N' of subcarriers used as shown in FIG. 10 (0 is not input for these subcarriers) is smaller than the FFT size N. Here it is so arranged that the subcarrier $f_0$ corresponding to a DC component and subcarriers in the vicinity of $f_{-N/2}$, $f_{+N/2}$ are not used. Adopting this arrangement improves reliability or facilitates RF transmit-signal processing. (For example, see The Institute of Electronics, Information and Communication Engineers, 1998 Software Convention B-5-178 "Review of Higher-Harmonic Suppression Filters in OFDM Modulator", NTT Wireless System Research Laboratory, and The Institute of Electronics, Information and Communication Engineers, 1998 Software Convention B-5-241 "Review of DC Offset in OFDM Modem", NTT Wireless System Research Laboratory.)

FIG. 11 is a frequency spectrum in a case where subcarriers used as shown in FIG. 10 have been selected.

The signal that has undergone IFFT processing is input to a GI (Guard Interval) add-on unit 1d. The latter executes processing to add a guard interval onto the IFFT output signal in order to eliminate inter-symbol interference. The processing above is executed by an FPGA or LSI circuit and the output thereof is the result of a numerical operation. A digital analog converter (DAC) 1e is used to convert the result of this numerical operation to an actual electric signal in the form of voltage or current.

The analog baseband signal obtained by the above-described processing contains many higher harmonic components in view of the nature of IFFT or DAC processing. This signal is band-limited by a low-pass filter (LPF) 3 to extract an analog baseband signal of a desired band and input this baseband signal to a mixer (MIX) 4 such as a quadrature modulator. The mixer 4 mixes a high-frequency signal, which is generated by an oscillator 5, with the baseband signal and converts this baseband signal to a high-frequency signal. An image component produced by mixing and unwanted waves such as spurious waves are removed by a bandpass filter (BPF) 6, after which the resultant signal is transmitted from an antenna via a high-frequency amplifier (not shown) or the like as a modulated signal.

The main reason why the subcarrier $f_0$ that corresponds to the DC component is not used (the reason why $f_0$=DC is made zero) in the IFFT processing of FIG. 9 is to avoid a situation in which local leakage produced by the frequency conversion using the analog mixer interferes with the subcarrier $f_0$. For example, if sine waves having the frequency $f_A$ of the carrier and the frequency $f_B$ of the baseband signal are mixed, signals representing $f_A+f_B$ and $f_A-f_B$ are generated and, in theory, a signal of frequency $f_A$ will not appear. In the actual circuitry, however, a leakage component of $f_A$ referred to as local leakage appears. If this leakage component were added to the subcarrier $f_0$, the information possessed by this subcarrier would tend to be erroneous. Empirically, this local leakage is a component as low as 10 to 40 dB with respect to the carrier but it is not zero. The subcarrier $f_0$ is not used for this reason.

Further, the reason why subcarriers in the vicinity of $f_{-N/2}$, $f_{+N/2}$ (e.g., a frequency domain having a width greater than at least the frequency spacing $2f_N/N$ of the subcarriers) are not used is that if they were used, the filter 3 would be required to have a steep characteristic. That is, before the signal frequency in the band of the baseband is up-converted, the band signal of the baseband is passed using the filter 3. However, if the subcarriers in the vicinity of $f_{-N/2}$, $f_{+N/2}$ were to be used, the frequency components would be rendered continuous and it would become difficult to separate the baseband band signal. This would necessitate a filter having an steep characteristic.

The OFDM transmitting apparatus executes the OFDM transmit-signal processing described above. In most of these apparatus the mixing by the mixer is performed in two stages, namely in the intermediate frequency (IF) band and high-frequency (RF) band. In the present invention, however, it is not necessary to emphasize this distinction and this aspect is omitted. Further, though it is necessary to execute processing such as power amplification before a signal is transmitted from the antenna, this is not a requisite component of the present invention and is omitted. Furthermore, the order of the mixer, BPF and amplifier, variations relating to the number thereof and isolators essential between these stages are similarly omitted.

The oscillator 5 and mixer 4 of FIG. 9 have an analog circuit structure. As a consequence, cost rises in pursuit of a reduction in unwanted signal components in the mixer, broadening of the band and greater stability of the oscillator. Further, the analog oscillator and mixer are substantially fixed in terms of frequency setting. This becomes a barrier when considering software wireless techniques that require flexible changes in circuitry. For this reason, there is prior art in which analog circuitry is eliminated from the arrangement of FIG. 9 (see the specifications of JP 8-23359A, JP 8-149170A and JP 52-113668A). This prior art applies special processing to the above-described digital baseband signal, extracts a prescribed frequency component by a band-pass filter BPF and uses this component as a modulated signal whose frequency has been up-converted. This prior art is premised upon the fact that a signal sampled at a sampling frequency fs and then output through a DAC is obtained as an ideal sampling signal for which pulse width τ=0 holds, as shown in FIG. 12. If the sampling frequency fs (=1/Ts) is selected to be the Nyquist frequency (fs>2·fb, where fb represents the baseband frequency) in such an ideal case, then a repetitive higher-harmonic component is not attenuated and can be made to appear every whole-number multiple of this frequency, thereby making it possible to extract a desired frequency component from the higher-harmonic component.

In general, digital signal processing performs a numerical operation using an FPGA or LSI circuit and the signal must be realized as an electric signal using the DAC 5. The DAC output signal is such that it is difficult to reduce pulse width as the band of communication broadens, and a zero-order hold state results, as shown in FIG. 14, in which the value at a certain clock timing is maintained until the next clock timing. As a result, the spectrum of the zero-order hold signal differs from that of the ideal sampling signal, as illustrated in FIG. 15, sinx/x-shaped amplitude attenuation is sustained along the frequency axis and the signal component becomes zero at a specific frequency. This phenomenon is referred to as "zero-cross". With a signal of the zero-order hold state where τ=Ts holds, zero-cross is produced every whole-number multiple of fs (=1/τ). As a result, the shape of the higher harmonic declines markedly in the vicinity of whole-number multiples of fs and a higher harmonic 100 to be extracted undergoes a great amount of attenuation in the vicinity of the center of the band and is difficult to utilize as a modulated signal. In other words, a higher-harmonic component of any degree can no longer be extracted. FIG. 16 is a diagram useful in describing prior art adapted so that it can be compared with the present invention, described later. In FIG. 16, (a) shows the spectrum of the baseband signal that is input to the DA converter 1e, (b) the spectrum of the baseband signal that is output from the DA converter 1e when sampling has been performed at an impulse sequence in the DA converter, (c) the spectrum of the baseband signal, which has sustained sinx/x-shaped amplitude attenuation, output from the DA converter 1e at the time of sample-and-hold, and (d) the spectrum of the baseband signal that prevails when the frequency of a receive signal 101 has been down-converted in a receiving apparatus. The signal declines markedly at the center of the band and the probability that information cannot be decoded correctly increases.

The examples of the prior art described in the specifications of JP 8-23359A and JP 8-149170A take this decline in amplitude based upon sinx/x into account but give rise to the following problem: The art described in JP 8-23359A is such that in view of the occurrence of sinx/x-shaped amplitude attenuation in which the higher harmonic obtained by a sampling operation whose duty ratio is 50% experiences zero-cross occurs at odd-numbered multiples of the fundamental frequency, the higher harmonic is selected so as to avoid this portion of attenuated amplitude. However, JP 8-23359A cannot extract the higher-harmonic component from the flat portion at the crest of the sin/x/waveform but instead extracts it from the sloping portion of the sinx/x waveform. The power of the higher harmonic is therefore low and, moreover, is non-uniform with respect to frequency. This means that the higher-harmonic component cannot be extracted precisely.

The example of the prior art described in the specification of JP 8-149170A is such that since sinx/x-shaped frequency spectrum attenuation is produced in the higher harmonic, a higher harmonic is selected so as to avoid this portion of attenuated amplitude in a manner similar to that of JP 8-23359A.

In other words, JP 8-149170A cannot extract the higher-harmonic component uniformly from the flat portion at the crest of the sinx/x waveform but instead extracts it from the sloping portion of the sinx/x waveform. The power of the higher harmonic is low and non-uniform with respect to frequency and the higher-harmonic component cannot be extracted precisely.

The example of the prior art described in the specification of JP 52-113668A is based upon a frequency conversion operation that utilizes a higher harmonic when an analog signal is processed by a digital filter. However, the output signal of the filter is a sampling pulse that does not undergo zero-order hold. The specification of JP 52-113668A describes sampling pulses using a δ function. In a case where operation is performed with a finite pulse width, a problem similar to that of the prior art shown in FIG. 9 arises.

SUMMARY OF THE INVENTION

Accordingly, an object of the present invention is to so arrange it that a higher harmonic is extracted even with a zero-order hold signal having a finite pulse width, thereby making an analog oscillator and mixer unnecessary in a frequency converting apparatus.

Another object of the present invention is to enlarge the range of selection of a higher harmonic and extract a higher harmonic of a satisfactory signal energy, the higher harmonic being as uniform as possible with respect to frequency.

According to a first aspect of the present invention, there is provided a transmitting method in which a signal obtained by applying an inverse Fourier transform to a plurality of digital subcarrier signals having frequencies that differ from one another is transmitted after being subjected at least to a digital-to-analog conversion. The method does not use frequencies in the vicinity of 0 Hz as the frequencies of valid subcarrier signals.

In a second aspect of the present invention, frequencies included in frequency ranges of $$f_{-M/2} \text{ to } f_{-N/2}, f_{M/2} \text{ to } f_{(N/2)-1}$$

are used as the frequencies of the valid subcarrier signals, where N-number of subcarrier frequencies are represented by $$f_{-N/2}, f_{(-N/2)+1}, \ldots, f_0, f_1, \ldots f_{(N/2)-1}$$

and frequencies on both sides farthest from 0 Hz that are not used as the frequencies of the valid subcarrier signals are represented by $f_{-M/2}, f_{M/2}$.

In a third aspect of the present invention, the frequency of the signal obtained by the inverse Fourier transform is up-converted by passing a higher-harmonic signal of a prescribed band included in a signal obtained by the DA conversion.

According to a fourth aspect of the present invention, there is provided a transmitting apparatus in which a signal obtained by applying an inverse Fourier transform to a plurality of digital subcarrier signals having frequencies that differ from one another is transmitted after being subjected at least to a digital-to-analog conversion. The apparatus does not use frequencies in the vicinity of 0 Hz as the frequencies of valid subcarrier signals.

According to a fifth aspect of the present invention, there is provided a transmitting apparatus in which a signal obtained by applying an inverse Fourier transform to a plurality of digital subcarrier signals having frequencies that differ from one another is transmitted after being subjected at least to a digital-to-analog conversion. In this apparatus, the vicinity of zero frequency in a frequency distribution of valid digital subcarrier signals subjected to the inverse Fourier transform is made coarser than a vicinity of the distribution that is one-half of IFFT sampling frequency.

In accordance with the present invention, it is so arranged that frequencies in the vicinity of 0 Hz are not used as the frequencies of the valid subcarrier signals even in a case where sample and hold (zero-order hold) is performed using finite-width sampling pulses in a DA conversion. As a result, a higher harmonic can be separated and extracted reliably. This means that an analog oscillator and mixer can be dispensed with in a frequency converter.

Further, in accordance with the present invention, it is so arranged that frequencies included in frequency ranges of $$f_{-M/2} \text{ to } f_{-N/2}, f_{M/2} \text{ to } f_{(N/2)-1}$$

are used as the frequencies of the valid subcarrier signals, where N-number of subcarrier frequencies are represented by $$f_{-N/2}, f_{(-N/2)+1}, \ldots, f_0, f_1, \ldots f_{(N/2)-1}$$

and frequencies on both sides farthest from 0 Hz that are not used as the frequencies of the valid subcarrier signals are represented by $f_{-M/2}, f_{M/2}$. As a result, even in a case where zero-order hold is performed using sampling pulses having a finite pulse width, it is possible to extract a higher harmonic of any degree from a large, flat portion of a frequency spectrum. It is possible to extract a higher-harmonic signal of satisfactory signal energy, the signal being uniform with respect to frequency.

Further, in accordance with the present invention, it is so arranged that each item of parallel data is multiplied by a correction coefficient so as to flatten a higher-harmonic signal component of a desired band. This makes it possible to extract a higher harmonic of any degree having a flat frequency spectrum.

Other features and advantage of the present invention will be apparent from the following description taken in conjunction with the accompanying drawings.

DESCRIPTION OF THE PREFERRED EMBODIMENTS (A) Overview of the Present Invention

The present invention provides a transmitting method and apparatus in which a signal obtained by applying an inverse Fourier transform to a plurality of digital subcarrier signals having frequencies that differ from one another is transmitted after being subjected at least to a digital-to-analog conversion. Transmit data is subjected to a serial-to-parallel conversion in serial/parallel conversion means and the parallel data obtained by the conversion is output as valid subcarrier signal components. An IFFT unit executes an inverse Fourier transform using subcarrier components other than the valid subcarrier components as zero. At such time frequencies in the vicinity of 0 Hz are not used as the frequencies of the valid subcarrier signals. That is, frequencies included in frequency ranges of $$f_{-M/2} \text{ to } f_{-N/2}, f_{M/2} \text{ to } f_{(N/2)-1}$$

are used as the frequencies of the valid subcarrier signals, where frequencies on both sides spaced away by more than at least $f_N/N$ from 0 Hz that are not used as the frequencies of the valid subcarrier signals are represented by $f_{-M/2}, f_{M/2}$. A DA converter samples the synthesized signal and holds it for the duration of the sampling period. A band-pass filter up-converts the signal by a higher-harmonic signal component of a prescribed band included in the signal obtained by the DA conversion.

In accordance with the operation described above, it is possible to extract a higher harmonic of any degree from a large, flat portion of a frequency spectrum even in a case where zero-order hold is performed using sampling pulses having a finite pulse width. It is possible to extract a higher-harmonic signal of satisfactory signal energy, the signal being uniform with respect to frequency.

(B) First Embodiment

Figure 1:
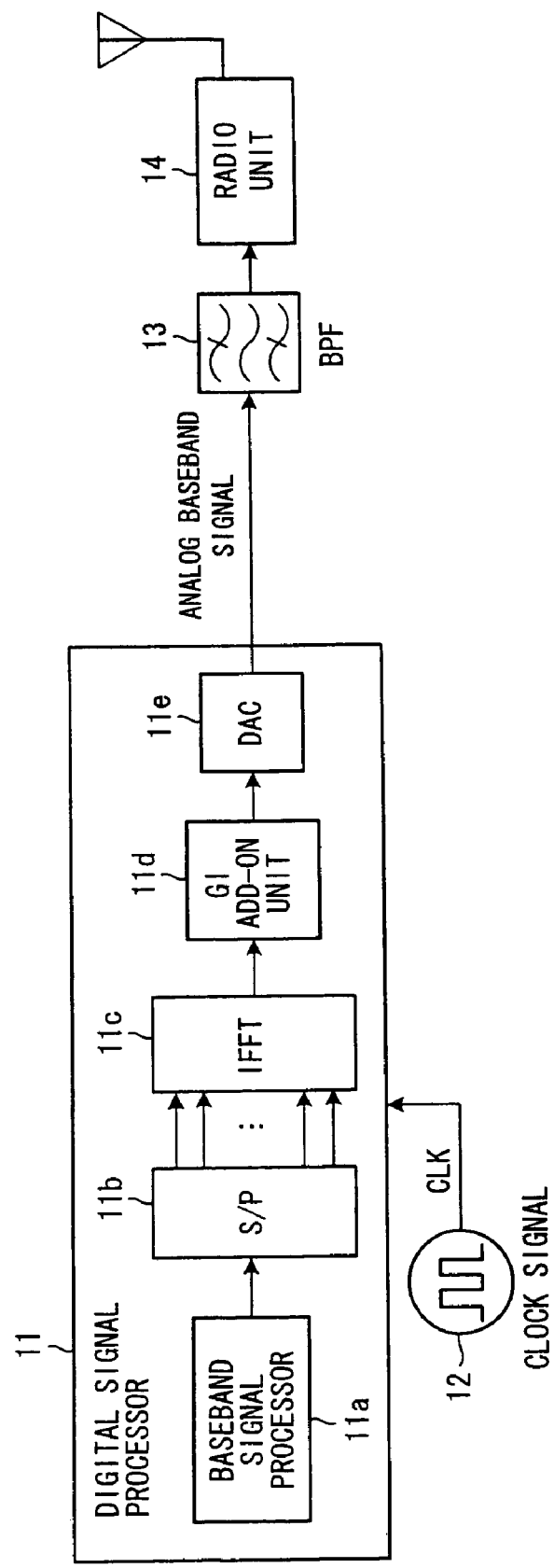
FIG. 1 is a block diagram illustrating the main part of a transmitting apparatus according to a first embodiment of the present invention.

FIG. 1 is a block diagram illustrating the main part of a transmitting apparatus according to a first embodiment of the present invention. A digital signal processor 11 executes digital signal processing in conformity with a reference clock signal CLK that is output from an oscillator 12. More specifically, the major part of the digital signal processor 11 that excludes a DA converter DAC is constituted by a circuit, such as an LSI circuit or FPGA, for executing numerical processing. All of the circuitry constructing the digital signal processor 11 operates in conformity with the reference clock signal CLK.

A baseband signal processor 11a executes signal processing (baseband signal processing) that is not essential for OFDM, e.g., processing such as appending of an error correction/detection code to a signal to be transmitted, interleaving, multivalued modulation and code spreading. Depending upon the scheme, there are also arrangements in which interleaving, multivalued modulation and code spreading are executed after the serial-to-parallel conversion (S/P conversion), unlike the above scheme. However, the present invention does not necessitate a limitation regarding the order and absence or presence of these types of signal processing.

A serial/parallel converter (S/P converter) 11b converts the result of processing (serial data) by the baseband signal processor 11a to parallel data and inputs the parallel data to an IFFT (inverse fast-Fourier transform) unit 11c. The number of parallel signals from the S/P conversion is set in dependence upon the number N' of valid subcarriers in the IFFT. It should be noted that in OFDM of the kind where code spreading is carried out after the S/P conversion, the following relation holds:

number of parallel signals=[number of valid subcarriers]/[spreading factor]

Further, the number N' of valid subcarriers is less than the FFT size N.

The IFFT unit 11c executes IFFT processing using N'-number of items of parallel data $D_0$ to $D_{N'-1}$, which are input from the S/P converter 11b, as N'-number of valid subcarrier components and using the remaining (N-N')-number of subcarrier components as zero, thereby effecting a conversion to discrete time signals. The correspondence between IFFT and FFT specifications are as follows: If $\Delta f$ represents the frequency spacing of the subcarrier signals, N the number of subcarrier signals and $f_N = N \cdot \Delta f$ holds in IFFT, then $f_N$ will be the FFT subsampling frequency and N will be the FFT size in FFT.

Figure 2:
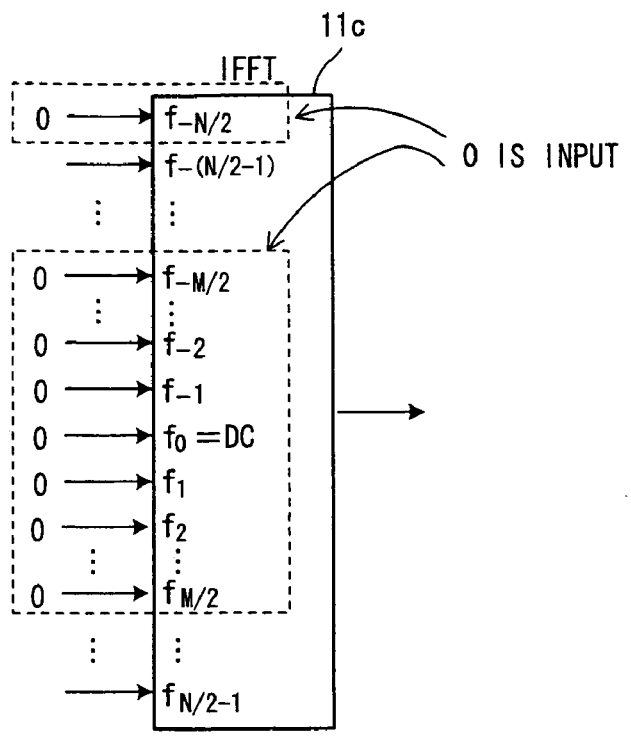
FIG. 2 is a diagram useful in describing the valid subcarrier frequency.

Since the outputs of the S/P converter 11b are N' in number, which is smaller than the FFT size, 0 is input to the invalid subcarrier signal terminals and N'-number of items of parallel data are input to the valid subcarrier signal terminals. According to the present invention, if the N-number of subcarrier frequencies are $$f_{-N/2}, f_{(-N/2)+1}, \ldots, f_0, f_1, \ldots, f_{(N/2)-1}$$

then the input-signal connections are as follows, as illustrated in FIG. 2: N'-number of frequencies in the frequency ranges $$f_{-M/2} \text{ to } f_{-N/2}, f_{M/2} \text{ to } f_{(N/2)-1} \quad (1)$$

from among subcarrier frequencies centered on $f_0$=DC are employed as the valid subcarrier frequencies, and inputs corresponding to a total number of M+2 subcarriers, namely the total of (M+1)-number of frequencies among $$f_{-M/2} \text{ to } f_{M/2} \quad (2)$$

and the frequency $f_{-N/2}$, are made 0. Hence, we have the following:

$$M = [FFT \text{ size } N] - [\text{number } N' \text{ of valid subcarriers}] - 2 \quad (3)$$

It should be noted that the FFT size and the number of valid subcarriers are set in accordance with the required specifications of the system and the transfer characteristic of the propagation path.

In other words, frequencies in the vicinity of 0 Hz are not used as frequencies of valid subcarrier signals. More specifically, when frequencies on both sides farthest from 0 Hz not used as frequencies of valid subcarrier signals are represented by $f_{-M/2}$, $f_{M/2}$, frequencies included in the frequency ranges given by Expression (1) are used as the frequencies of the valid subcarrier signals and frequencies included in the frequency range given by Expression (2) are not used as valid subcarriers.

The reason for adopting frequencies in the ranges indicated by Expression (1) as the valid subcarrier frequencies is to so arrange it that higher harmonics of any degree may be extracted from a large, flat portion of a frequency spectrum, thereby making it possible to extract a higher-harmonic signal of satisfactory signal energy, the signal being uniform with respect to frequency. The reason for not adopting frequencies in the range indicated by Expression (2) as valid subcarrier frequencies is to so arrange it that a desired higher-harmonic band can be extracted reliably using a band-pass filter.

Figure 3:
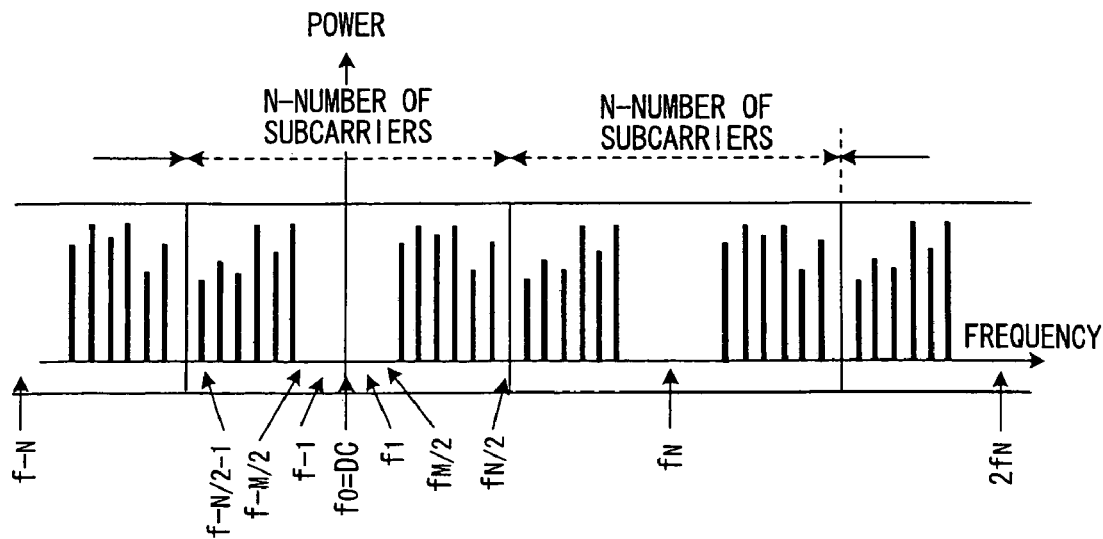
FIG. 3 illustrates a frequency spectrum of an input signal to an IFFT unit.

Furthermore, the reason for not using the frequency $f_{-N/2}$ as a subcarrier signal is the same as that for adopting zero for $f_0$=DC, namely to avoid a situation in which local leakage produced by the frequency conversion using the analog mixer for RF interferes with the subcarriers. Further, the number M is decided as necessary. By virtue of the foregoing, the frequency spectrum of the input signal to the IFFT unit 11c becomes as shown in FIG. 3.

The signal that has undergone IFFT processing is input to a GI add-on unit 11d. The latter executes processing to add a guard interval onto the IFFT output signal in order to eliminate inter-symbol interference. The size of the guard interval is set in accordance with the required specifications of the system and the transfer characteristic of the propagation path.

A digital analog converter (DAC) 11e is used to convert the discrete digital time signals, onto which the guard interval has been added, to an actual electric signal in the form of voltage or current. The DAC 11e samples the discrete time signals, onto which the guard interval has been added, at the sampling frequency fs, holds the sampled signal for sampling period and then inputs the signal to a band-pass filter (BPF) 13.

The analog baseband signal contains many higher harmonic components in view of the nature of IFFT or DAC processing. This signal therefore is band-limited by the band-pass filter 13 to extract and output a desired higher-harmonic signal of degree m [a higher-harmonic signal the band of which is $m \cdot f_N$ to $(m+1) \cdot f_N$]. The transmit signal is thenceforth transmitted from an antenna via an RF mixer, high-frequency amplifier and isolator (not of which are shown) in a radio unit 14.

Figure 4:
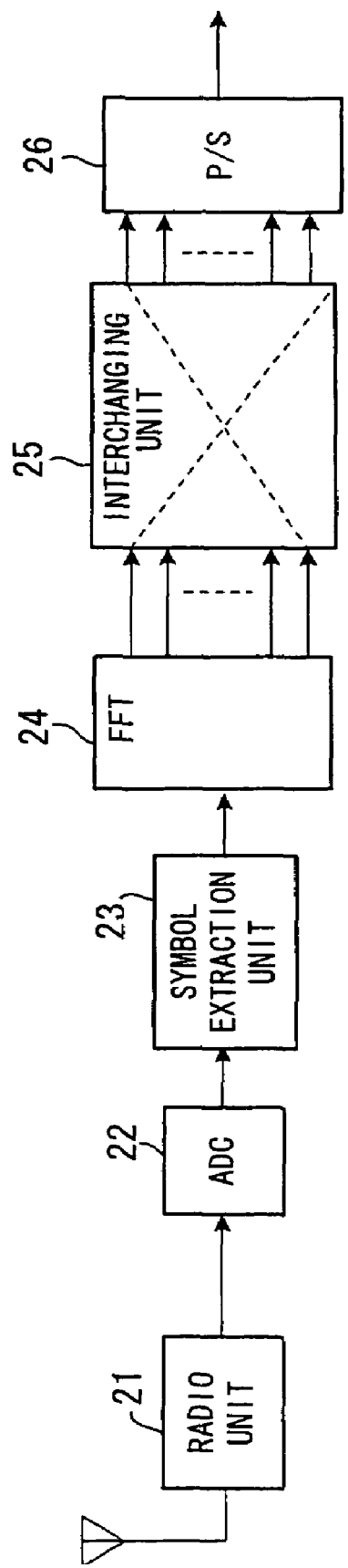
FIG. 4 is a block diagram illustrating the main part of a receiving apparatus.

FIG. 4 is a block diagram illustrating the main part of a receiving apparatus. A radio unit 21 applies processing such as high-frequency amplification and frequency conversion to a signal received by an antenna, down-converts a higher-harmonic signal, which has a band $m \cdot f_N$ to $(m+1) \cdot f_N$, to a baseband signal and inputs the baseband signal to an AD converter 22. The latter converts the baseband signal to digital data and inputs the digital data to an OFDM symbol extraction unit 23. The latter extracts OFDM symbols from the input data sequence and then inputs the symbols to an FFT unit 24 upon removing the guard interval. The FFT unit 24 applies FFT processing to the OFDM symbols, which comprise N-number of symbols, and outputs a frequency spectrum having N-number of subcarriers $f_{-N/2}$ to $f_{(N/2)-1}$. For reasons that will be described later, an interchanging unit 25 rearranges+subcarrier signal components and−subcarrier signal components, and a parallel-to-serial converter (P/S) 26 outputs, serially in numerical order, signal values of valid subcarrier signals contained in the parallel data.

The foregoing is a description of operation that does not take into account any fluctuation in OFDM subcarrier frequencies ascribable to adding on of the guard interval. Strictly speaking, in a case where the guard interval is added on, OFDM subcarrier frequency is given by $(n/N)f_N'$ (where $f_N'$ represents the symbol rate after adding on of the guard interval and n=−N/2 to N/2−1 holds), and $f_N'$ is expressed by the following equation:

$$f_N' = f_N \cdot (N + \text{size of the guard interval})/N$$

The symbol rate $f_N'$ is the operating clock frequency $fs$ of the DAC.

Figure 5:
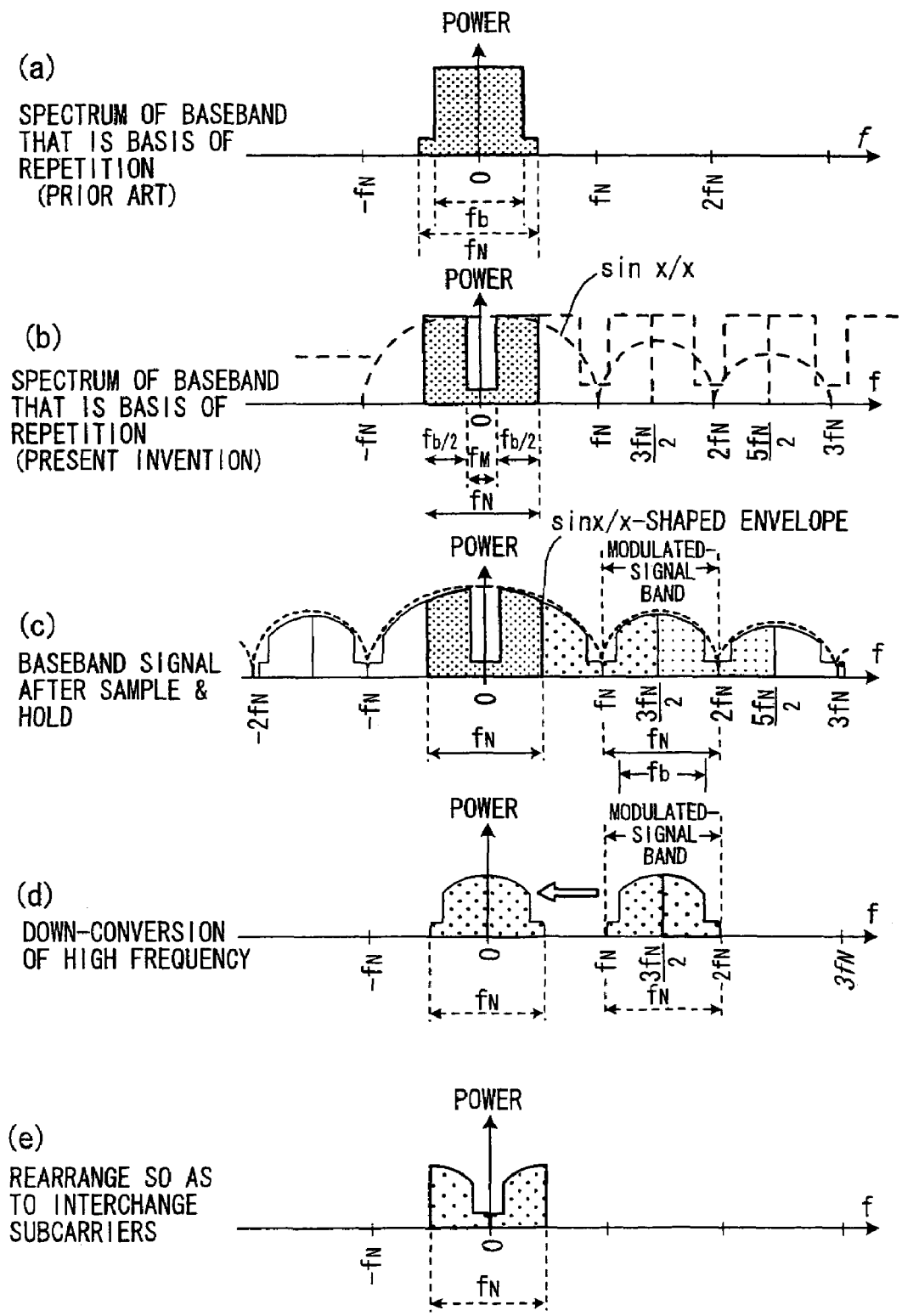
FIG. 5 illustrates waveforms useful in describing the operation of the first embodiment.

FIG. 5 illustrates waveforms useful in describing the operation of the first embodiment.

In the first embodiment of FIG. 1, the transmit data obtained by the baseband signal processor 11a of the digital signal processor 11 is input successively to the S/P converter 11b, IFFT unit 11c, GI add-on unit 11d and DA converter 11e and is thereby subjected to a serial-to-parallel conversion, IFFT, GI add-on and DA conversion processing.

The signal input to the DA converter 11e, which is the result of numerical processing that is synchronized to the clock signal CLK, is converted by the DA converter 11e to an electric signal representing current or voltage. As a result, the output of the digital signal processor 11 is a zero-order hold signal.

In IFFT processing, certain limitations are applied. Specifically, as depicted in FIGS. 2 and 3, frequencies in the vicinity of 0 Hz, namely frequencies within the range indicated by Expression (2), are not used as subcarrier frequencies. Rather, frequencies within the ranges indicated by Expression (1) are used as the subcarrier frequencies. Further, the frequency $f_{-N/2}$ is not used as a subcarrier frequency.

As a result, the temporal discrete signal output from the IFFT unit 11c, namely the spectrum of the baseband signal that is input to the DA converter 11e, becomes as indicated by the solid line in (b) of FIG. 5 according to the present invention. This is the spectrum of a baseband that serves as the basis of repetition. Note that the spectrum of a baseband signal according to the prior art is illustrated at (a) of FIG. 5.

Figure 12:
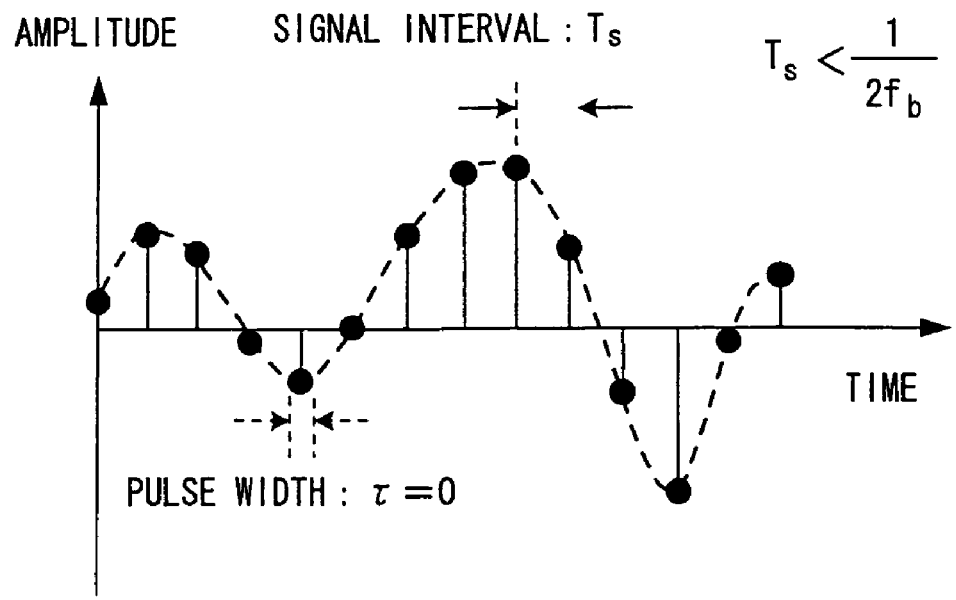
FIG. 12 illustrates an ideal sampling signal for which pulse bandwidth τ=0 holds.
Figure 13:
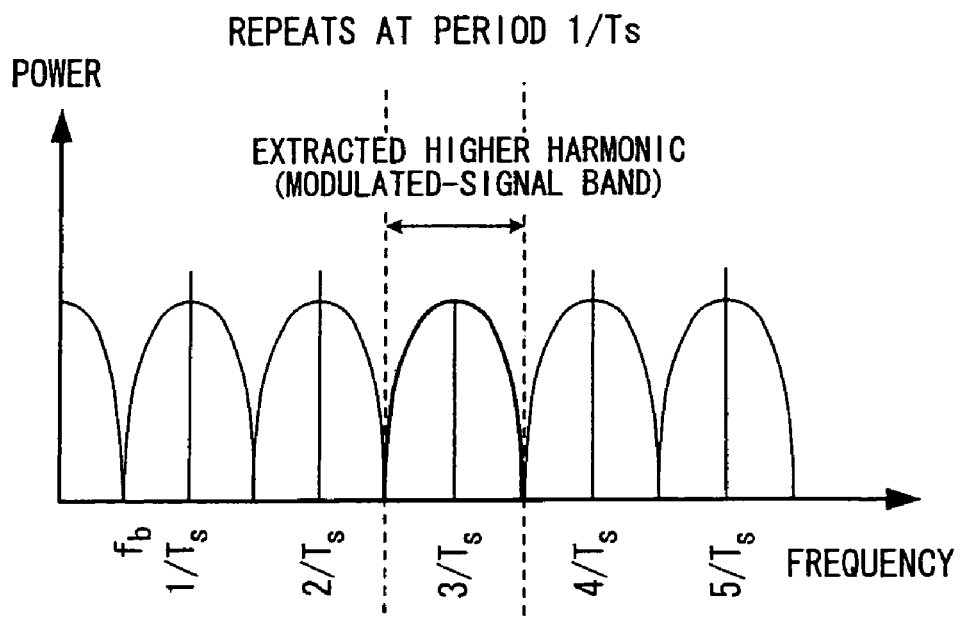
FIG. 13 illustrates the spectrum of a higher-harmonic component of a DA converter output signal for which τ=0 holds.
Figure 14:
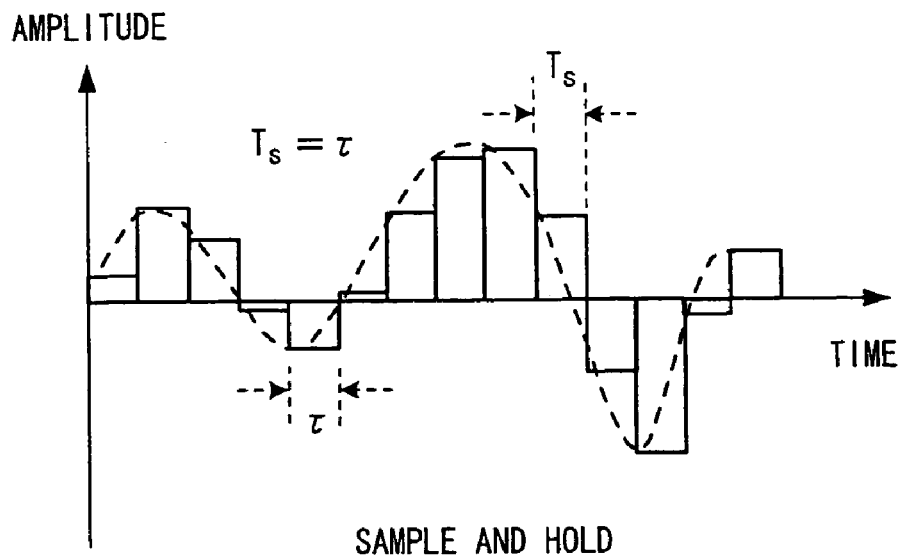
FIG. 14 is a diagram useful in describing a sampling signal having a finite pulse width.
Figure 15:
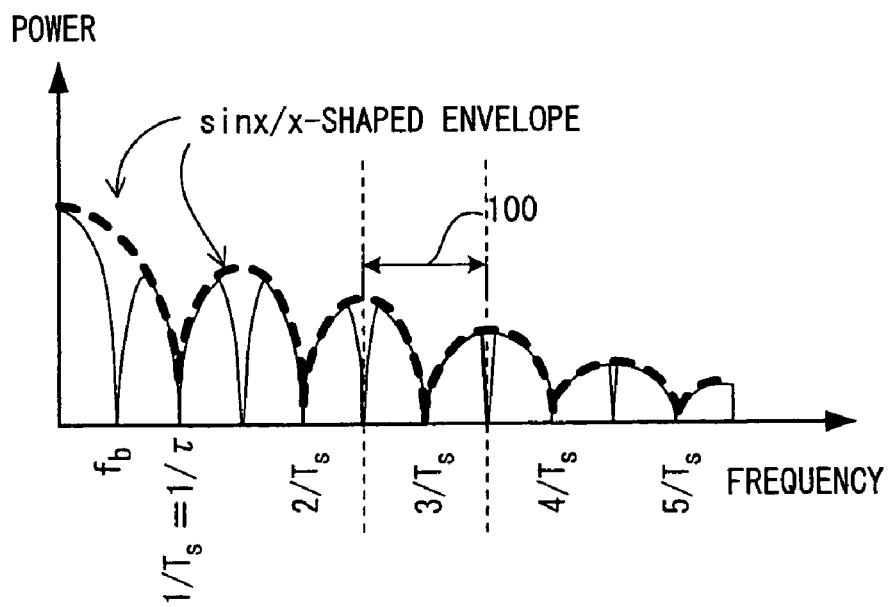
FIG. 15 illustrates the spectrum of an analog signal based upon a zero-order hold signal having a finite pulse width.
Figure 16:
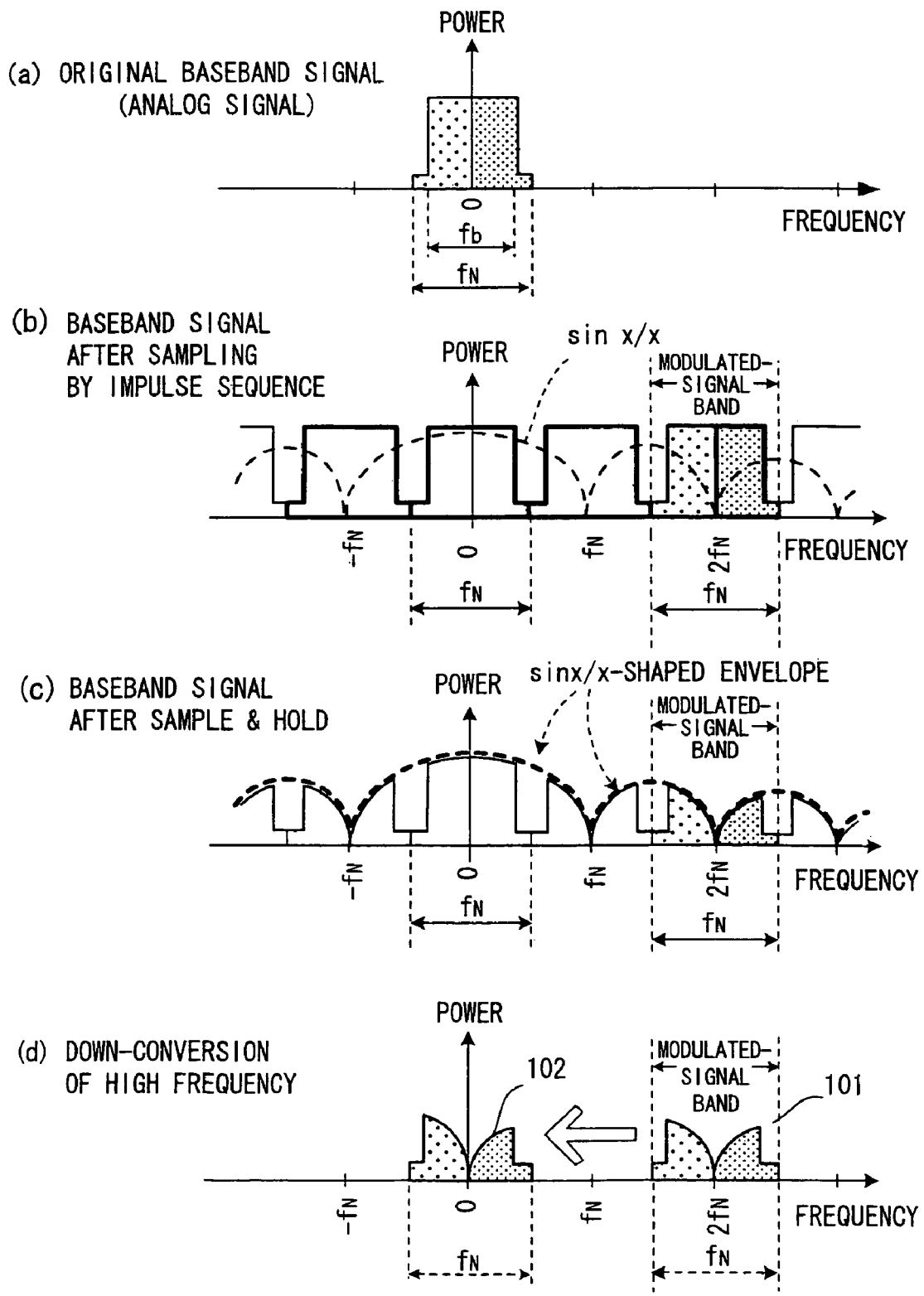
FIG. 16 is a diagram useful in describing the operation of the prior art.

When the signal having the spectrum of (b) in FIG. 5 is subjected to a digital-to-analog conversion, time waveforms of the kind shown in FIGS. 12 and 14 are obtained. The input signal to the DA converter possesses the result of numerical processing only at the timing of the clock signal, as shown in FIG. 12, and the pulse width is taken as zero. However, the output signal of the DA converter becomes a waveform in which the pulse width is equal to the clock period, as illustrated in FIG. 14. Thus, when the IFFT signal is sampled and the sampled signal is held for the duration of the sampling period, the frequency spectrum of the output signal from the DA converter sustains sinx/x-shaped amplitude attenuation along the frequency axis, as indicated by the dashed line at (b) in FIG. 5. As a result, the spectrum of the analog signal that is output from the DA converter becomes a frequency spectrum suppressed by sinx/x, as indicated by the solid line at (c) of FIG. 5. That is, there is obtained a continuous spectrum of band width $f_b$ that crosses zero at whole-number multiples ($\pm f_N$, $\pm 2f_N$, . . . ) of frequency $f_N$ and that is centered on odd-numbered multiples of $f_{N/2}$. Zero-cross does not occur at the center frequency. It should be noted that in a case where the baseband signal has the spectrum shown at (a) of FIG. 5, the spectrum of band width $f_b$ crosses zero at the center frequency, as illustrated at (c) in FIG. 16.

The band-pass filter 13 passes the higher-harmonic signal of band $m \cdot f_N$ to $(m+1) \cdot f_N$ (where $m \geq 2$ holds and m is an integer) contained in the analog signal obtained by the DA conversion and therefore can output a signal that is the result of up-converting the frequency of the baseband signal by a factor of m.

When reception processing is executed, on the other hand, the radio unit 21 (see FIG. 4) subjects the receive signal to quadrature demodulation or the like to thereby down-convert the frequency thereof and outputs the baseband signal having the spectrum shown at (d) of FIG. 5. The AD converter 22 converts the baseband signal to digital data to digital data and inputs the digital data to the OFDM symbol extraction unit 23. The latter extracts an OFDM symbols and inputs the symbols to the FFT unit 24. The latter executes FFT processing to reproduce the subcarrier information that corresponds to the input signal to the IFFT unit of the transmitting apparatus. If (b) and (d) of FIG. 5 are compared, it will be obvious that subcarriers in a positive frequency domain and subcarriers in a negative frequency domain are in the wrong places. Accordingly, the interchanging unit 25 interchanges the subcarriers in the positive frequency domain and the subcarriers in the negative frequency domain [see (e) in FIG. 5], and the parallel/serial converter 26 outputs, serially in numerical order, signal values of valid subcarrier signals contained in the parallel data, thereby making it possible to reproduce the transmitted signal correctly.

Thus, in accordance with the first embodiment, it is so arranged that frequencies in the vicinity of 0 Hz are not used as the frequencies of subcarrier signals even in a case where sampling and holding is performed using sampling pulses of finite pulse width in DA conversion. As a result, a spectrum between a higher harmonic of any degree and a higher harmonic of the neighboring degree can be made zero, and a higher harmonic of any degree can be extracted reliably even if a band-pass filter having a steep characteristic is not employed.

Further, in accordance with the present invention, frequencies included in frequency ranges of $$f_{-M/2} \text{ to } f_{-N/2}, f_{M/2} \text{ to } f_{(N/2)-1}$$

are used as the frequencies of the valid subcarrier signals, where N-number of subcarrier frequencies are represented by $$f_{-N/2}, f_{(-N/2)+1}, \ldots, f_0, f_1, \ldots f_{(N/2)-1}$$

and frequencies on both sides farthest from 0 Hz that are not used as the frequencies of the subcarrier signals are represented by $f_{-M/2}$, $f_{M/2}$. As a result, even in a case where zero-order hold is performed using sampling pulses having a finite pulse width, it is possible to extract a higher harmonic of any degree from a large, flat portion of a frequency spectrum. It is possible to extract a higher-harmonic signal of satisfactory signal energy, the signal being uniform with respect to frequency.

Further, in accordance with the first embodiment, it is so arranged that a frequency of $f_{-N/2}$ is not used as a subcarrier signal. This makes it possible to avoid a situation in which local leakage produced by the frequency conversion using the analog mixer for RF interferes with the subcarriers.

(C) Second Embodiment

Figure 6:
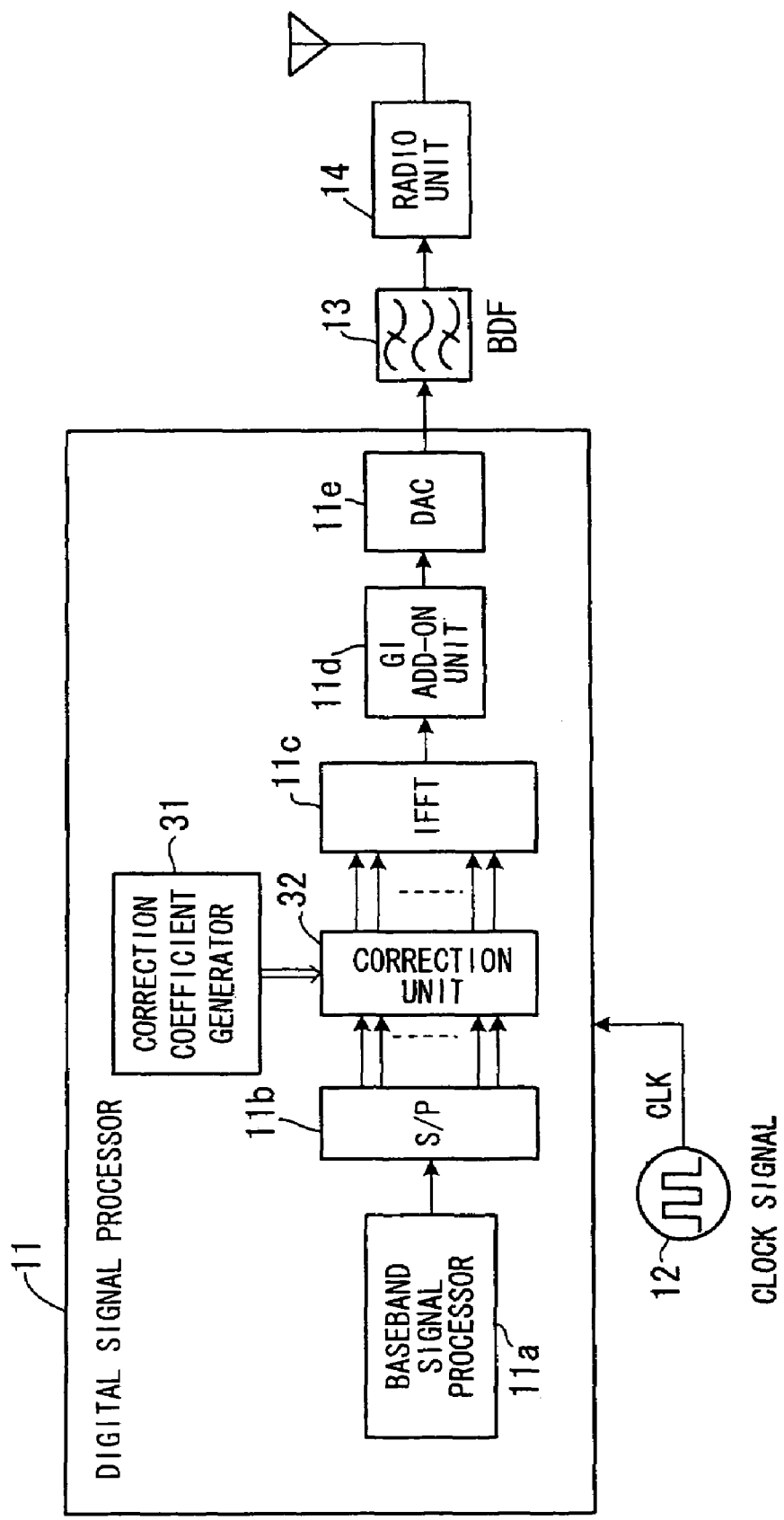
FIG. 6 is a block diagram illustrating the main part of a second embodiment of the present invention.
Figure 7:
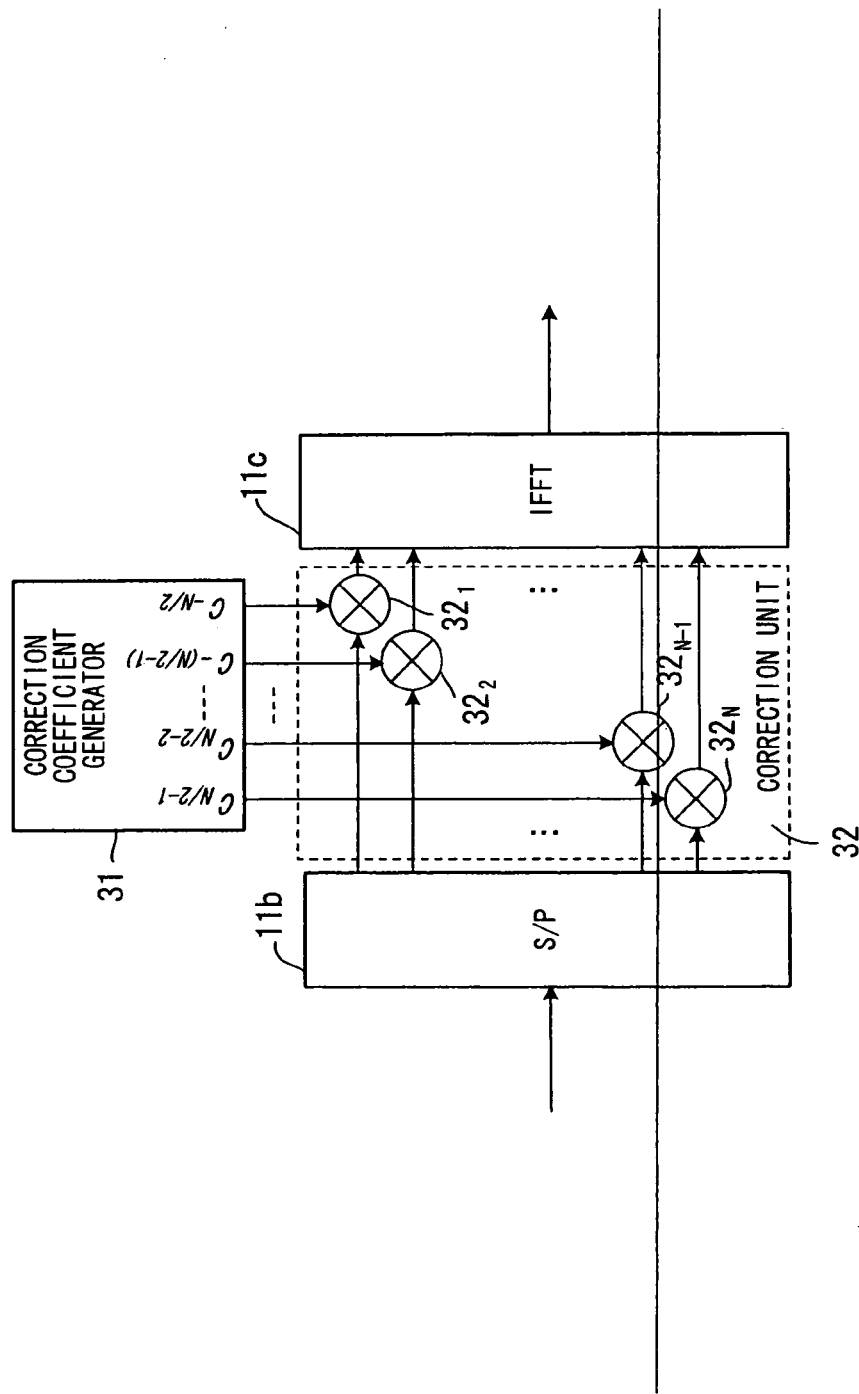
FIG. 7 is a diagram showing the structural details of a correction unit.

FIG. 6 is a block diagram illustrating the main part of a transmitting apparatus according to a second embodiment of the present invention, in which components identical with those of the first embodiment of FIG. 1 are designated by like reference characters. The second embodiment differs from the first embodiment in that it is provided with a correction coefficient generator 31 and correction unit 32. FIG. 7 illustrates the structural details of the correction unit 32.

Though it is true that the higher-harmonic spectrum extracted in the first embodiment does not exhibit zero-cross, the spectrum is susceptible to the effects of sinx/x-shaped amplitude attenuation and therefore the closer a subcarrier is to a whole-number multiple of $f_N$, the greater the effects of amplitude attenuation sustained. Amplitude attenuation with respect to any frequency f is expressed by the following equation:

$$|H(f)| = Ts \frac{\sin \pi f' Ts}{\pi f' Ts} \quad (4)$$

where Ts is the clock period and corresponds to $1/f_N$. Accordingly, a correction is possible by multiplying by the reciprocal of the above equation, and a correction coefficient c(f) with regard to a subcarrier of the band of the IFFT baseband is given by the following equation:

$$c(f) = 1 \Big/ \left( Ts \frac{\sin \pi f' Ts}{\pi f' Ts} \right) \quad (5)$$

where the following holds:

$$f' = f + k f_N \quad (6)$$

and k represents the degree of the desired higher harmonic. It is assumed that correction coefficients c(f) are as follows with respect to N-number of subcarriers:

$$C_{-N/2}, C_{-N/2+1}, \ldots, C_{-1}, C_0, C_1, \ldots, C_{N/2-2}, C_{N/2-1} \quad (7)$$

The correction coefficient generator 31 calculates the N-number correction coefficients in accordance with Equation (5) and inputs the coefficients to the correction unit 32. The latter has multipliers $32_1$ to $32_N$ (see FIG. 7) for multiplying the subcarrier signals by respective ones of the corresponding correction coefficients and inputs the products to the IFFT unit 11c. The latter executes inverse Fourier transform processing based upon the corrected subcarrier signals.

Figure 8:
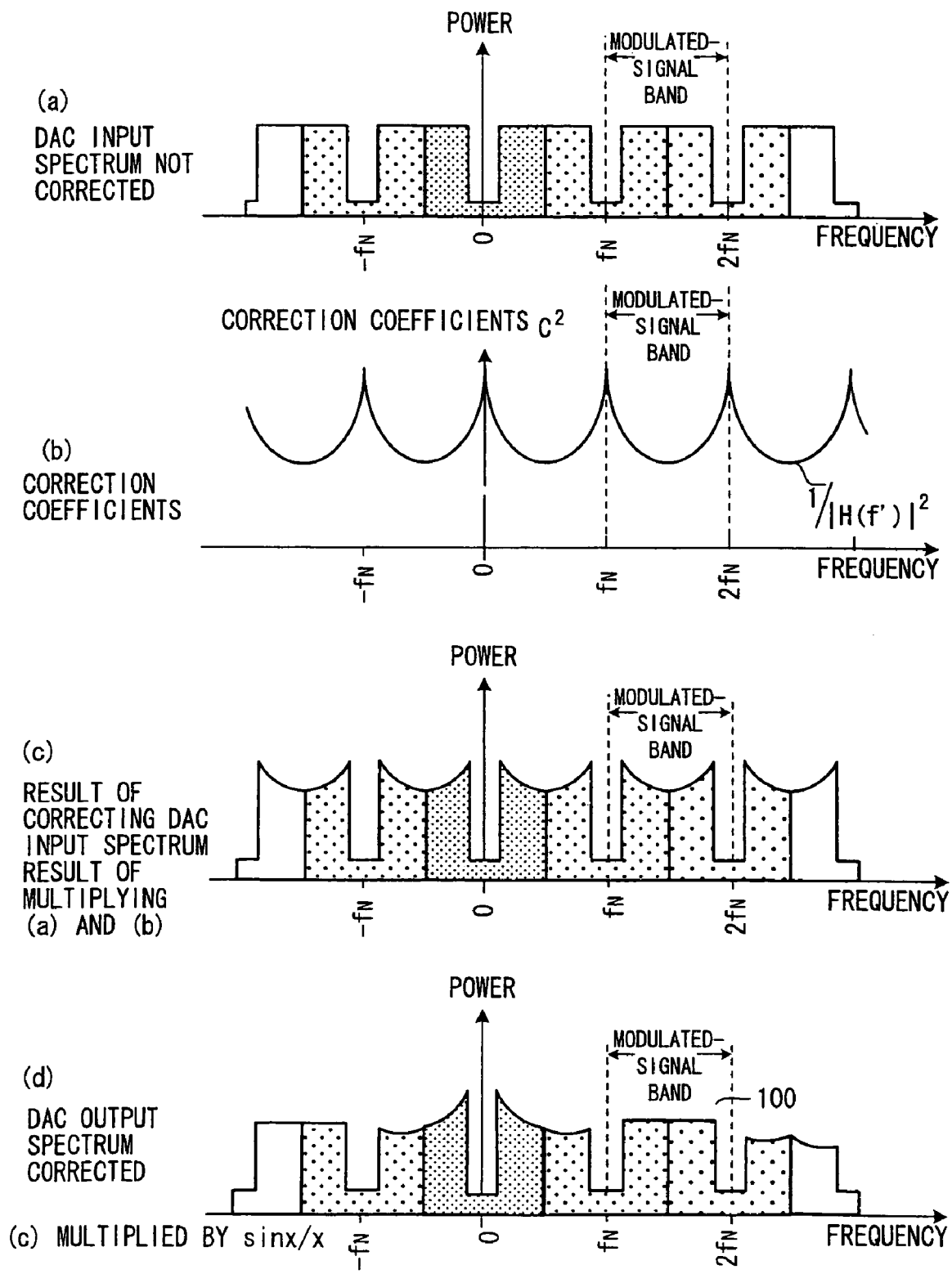
FIG. 8 is a diagram useful in describing the generation of correction coefficients.
Figure 9:
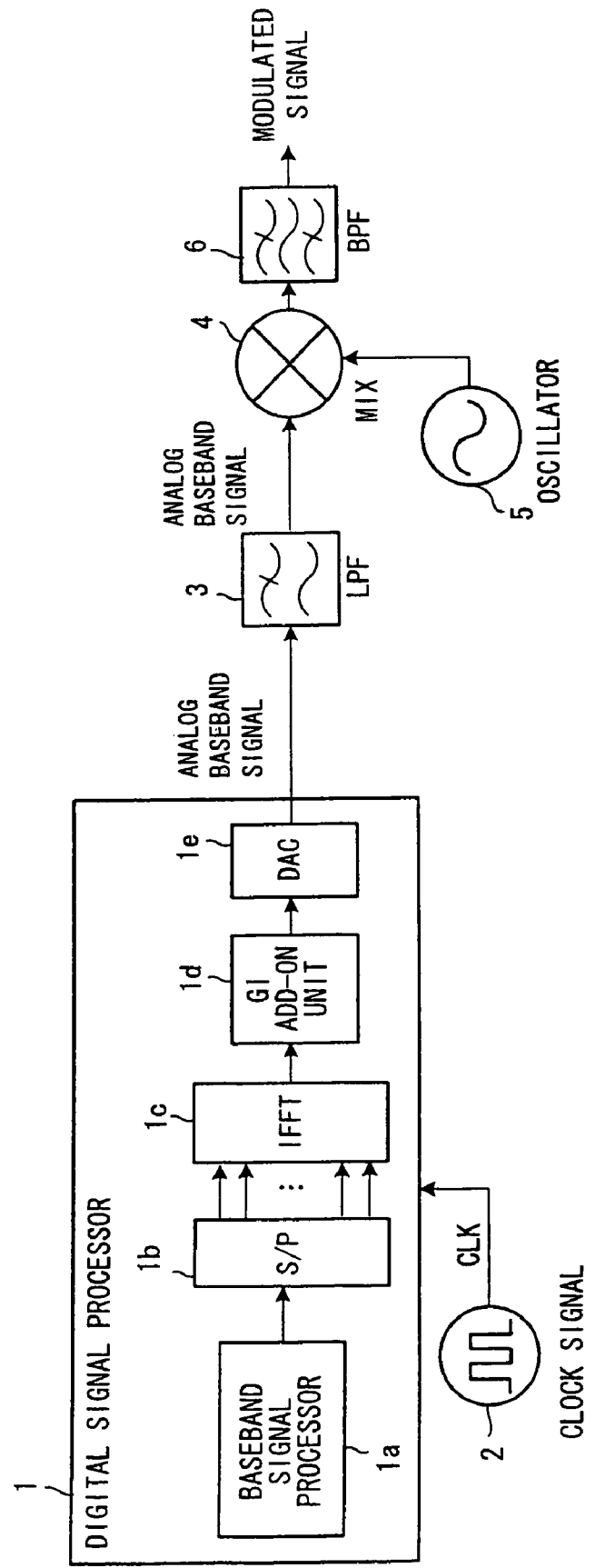
FIG. 9 is a diagram illustrating an example of the structure of an OFDM modulating apparatus exemplifying a typical modulating apparatus according to the prior art.
Figure 10:
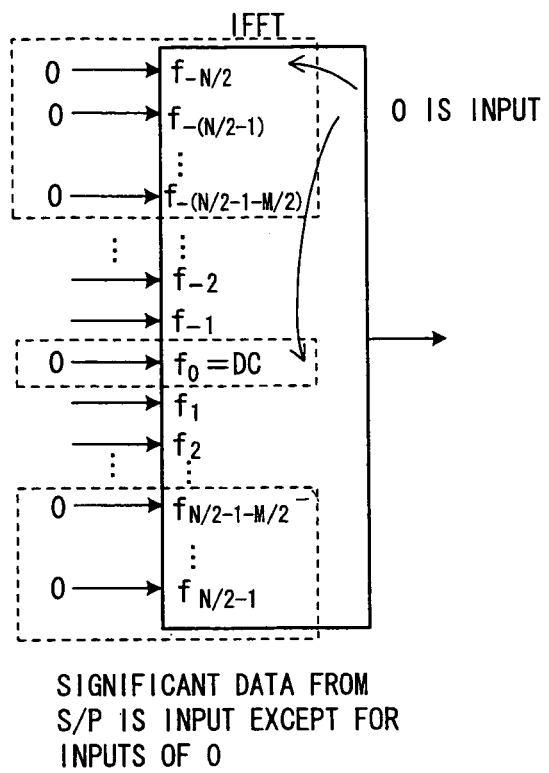
FIG. 10 is a diagram useful in describing valid subcarrier frequencies in a prior-art scheme.
Figure 11:
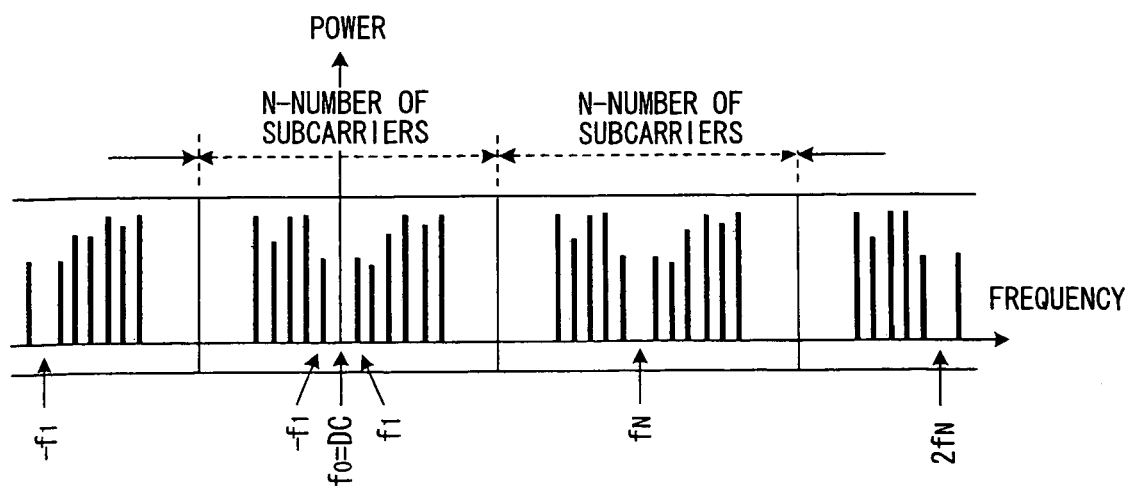
FIG. 11 is a frequency spectrum of an input signal to an IFFT unit in the prior-art scheme.

The generation of the correction coefficients is performed as shown in FIG. 8. More specifically, the correction coefficient generator 31 calculates and stores, as the correction coefficients of Expression (7) [see (b) in FIG. 8], N-number of inverse-function values in a prescribed modulated-signal band of an amplitude attenuation function H(f') produced by a finite-width sample-and-hold signal (zero-order hold signal). The correction unit 32 multiplies the subcarrier signals by the correction coefficients of Expression (7). As a result, the spectrum of the input to the DA converter 11e becomes as shown at (c) in FIG. 8. It should be noted that the spectrum of the input signal to the DA converter prior to correction is illustrated at (a) in FIG. 8.

If this input signal is subjected to a digital-to-analog conversion, a flat frequency characteristic (spectrum) is obtained only in a desired modulated-signal band, as illustrated at (d) in FIG. 8.

Thus, in accordance with the second embodiment, it is so arranged that the items of parallel data are multiplied by respective ones of correction coefficients so as to flatten the higher-harmonic signal component of a prescribed band $m \cdot f_N$ to $(m+1) \cdot f_N$. As a result, a higher harmonic of any degree having a flat frequency characteristic can be extracted.

The present invention has been described in detail in accordance with the drawings. However, the present invention is not limited to OFDM transmission and can be applied to any transmitting method and apparatus such as multicarrier transmission for multiplexing and transmitting a number of subcarriers.

As many apparently widely different embodiments of the present invention can be made without departing from the spirit and scope thereof, it is to be understood that the invention is not limited to the specific embodiments thereof except as defined in the appended claims.

What is claimed is:

1. A transmitting method for transmitting a signal, comprising steps of:
    applying an inverse Fourier transform to a plurality of digital subcarrier signal components by making the subcarrier signal components other than valid subcarrier signal components zero; and
    sampling a signal, which has been obtained by the inverse Fourier transform, at a sampling frequency, holding the signal for the duration of a sampling period and convening the signal to an analog signal,
    wherein no use is made of frequency of 0 Hz and frequencies in the vicinity of 0 Hz as frequencies of valid subcarrier signals.

2. The method according to claim 1, wherein frequencies included in frequency ranges of $$f_{-(M/2+1)} \text{ to } f_{-(N/2-1)}, f_{M/2+1} \text{ to } f_{(N/2)-1}$$

are used as the frequencies of the valid subcarrier signals, where N-number of subcarrier frequencies are represented by $$f_{-N/2}, f_{(-N/2)+1}, \ldots, f_0, f_1, \ldots f_{(N/2)-1}$$

and frequencies on both sides farthest from 0 Hz that are not used as the frequencies of the valid subcarrier signals are represented by $f_{-M/2}, f_{M/2}$.

3. The method according to claim 1, including a step of subjecting transmit data to a serial-to-parallel conversion and obtaining N'-number (where N'<N holds) of hems of parallel data, which have been obtained by the conversion, as the valid subcarrier signals.

4. The method according to claim 3, wherein the digital-to-analog conversion samples the signal, which has been obtained by the inverse Fourier transform, at a sampling frequency and holds the signal for the duration of the sampling period.

5. The method according to claim 1, including a step of up-converting the frequency of the signal, which has been obtained by the inverse Fourier transform, by passing a higher-harmonic signal of a prescribed band included in a signal obtained by the digital-to-analog conversion.

6. The method according to claim 5, including a step of multiplying each item of parallel data by a correction coefficient so as to flatten the higher-harmonic signal component of the desired band.

7. A transmitting method for transmitting a signal, comprising steps of:
  obtaining a signal by applying an inverse Fourier transform to a plurality of digital subcarrier signals having frequencies that differ from one another; and
  subjecting the signal to at least a digital-to-analog conversion,
  wherein no use is made of frequency of 0 Hz and frequencies in the vicinity of 0 Hz as frequencies of valid subcarrier signals,
  wherein frequencies included in frequency ranges of $f_{-(M/2+1)}$ to $f_{-(N/2-1)}$, $f_{M/2+1}$ to $f_{(N/2)-1}$ are used as the frequencies of the valid subcarrier signals, where N-number of subcarrier frequencies are represented by $f_{-N/2}, f_{(-N/2)+1}, \ldots, f_0, f_1, \ldots f_{(N/2)-1}$ and frequencies on both sides farthest from 0 Hz that are not used as the frequencies of the valid subcarrier signals are represented by $f_{-M/2}$, $f_{M/2}$, and
  wherein no use is made of a frequency $f_{-N/2}$ as frequency of a valid subcarrier signal.

8. A transmitting apparatus for transmitting a signal, which has been obtained by applying an inverse Fourier transform to a plurality of digital subcarrier signals having frequencies that differ from one another, after subjecting the signal to at least a digital-to-analog conversion, said apparatus comprising:
  means for applying the inverse Fourier transform to a plurality of digital subcarrier signal components by making the subcarrier signal components other than valid subcarrier signal components zero; and
  a digital-to-analog converter for sampling a signal, which has been obtained by the inverse Fourier transform, at a sampling frequency, holding the signal for the duration of a sampling period and converting the signal to an analog signal,
  wherein no use is made of frequency of 0 Hz and frequencies in the vicinity of 0 Hz as frequencies of valid subcarrier signals.

9. The apparatus according to claim 8, wherein frequencies included in frequency ranges of $f_{-(M/2+1)}$ to $f_{-(N/2-1)}$, $f_{M/2+1}$ to $f_{(N/2)-1}$ are used as the frequencies of the valid subcarrier signals, where N-number of subcarrier frequencies are represented by $f_{-N/2}, f_{(-N/2)+1}, \ldots, f_0, f_1, \ldots f_{(N/2)-1}$ and frequencies on both sides farthest from 0 Hz that are not used as the frequencies of the valid subcarrier signals are represented by $f_{-M/2}$, $f_{M/2}$.

10. The apparatus according to claim 9, said apparatus forgoing use of a frequency $f_{-N/2}$ as an effective subcarrier signal.

11. The apparatus according to claim 8, including a band-pass filter for passing a higher-harmonic signal of a prescribed band included in a signal obtained by the digital-to-analog conversion.

12. A transmitting apparatus for transmitting a signal, which has been obtained by applying an inverse Fourier transform to a plurality of digital subcarrier signals having frequencies that differ from one another, after subjecting the signal to at least a digital-to-analog conversion, said apparatus comprising:
  serial-to-parallel conversion means for subjecting transmit data to a serial-to-parallel conversion and outputting parallel data, which has been obtained by the conversion, as valid subcarrier signal components;
  means for applying an inverse Fourier transform to said valid subcarrier signal components by making the subcarrier signal components other than the valid subcarrier signal components zero;
  a digital-to-analog converter for sampling a signal, which has been obtained by the inverse Fourier transform, at a sampling frequency, holding the signal for the duration of a sampling period and converting the signal to an analog signal; and
  a band-pass filter for passing a higher-harmonic signal component of a prescribed band included in the signal obtained by the digital-to-analog conversion;
  wherein no use is made of frequency of 0 Hz and frequencies in the vicinity of 0 Hz as frequencies of the valid subcarrier signals.

13. The apparatus according to claim 12, wherein frequencies included in frequency ranges of $f_{-(M/2+1)}$ to $f_{-(N/2-1)}$, $f_{M/2+1}$ to $f_{(N/2)-1}$ are used as the frequencies of the valid subcarrier signals, where N-number of subcarrier frequencies are represented by $f_{-N/2}, f_{(-N/2)+1}, \ldots, f_0, f_1, \ldots f_{(N/2)-1}$ and frequencies on both sides farthest from 0 Hz that are not used as the frequencies of the valid subcarrier signals are represented by $f_{-M/2}$, $f_{M/2}$.

14. The apparatus according to claim 13, wherein no use is made of a frequency $f_{-N/2}$ as an effective subcarrier signal.

15. The apparatus according to claim 12, further comprising a multiplier for multiplying each item of parallel data by a correction coefficient so as to flatten the higher-harmonic signal component of the desired band.

16. A transmitting apparatus for transmitting a signal, which has been obtained by applying an inverse Fourier transform to a plurality of digital subcarrier signals having frequencies that differ from one another, after subjecting the signal to at least a digital-to-analog conversion, said apparatus comprising:
  serial-to-parallel conversion means for subjecting transmit data to a serial-to-parallel conversion and outputting parallel data, which has been obtained by the conversion, as valid subcarrier signal components;
  means for applying the inverse Fourier transform to said valid subcarrier signal components by making the subcarrier signal components other than the valid subcarrier signal components zero;
  a digital-to-analog converter for sampling a signal, which has been obtained by the inverse Fourier transform, at a sampling frequency, holding the signal for the duration of a sampling period and converting the signal to an analog signal; and
  a band-pass filter for passing a higher-harmonic signal component of a prescribed band included in the signal obtained by the digital-to-analog conversion,
  wherein a frequency distribution of valid digital subcarrier signals subjected to the inverse Fourier transform, at the vicinity of zero frequency is made coarser than the frequency distribution at a vicinity of one-half of IFFT sampling frequency.

* * * * *